Examine

Aug. 17, 1937.

R. B. P. CRAWFORD

Re. 20,469

Orig. 2,057,938

REGENERATIVE AIR CONDITIONING SYSTEM

Original Filed Feb. 23, 1932 3 Sheets-Sheet 1

Inventor:
Robert B.P. Crawford
By Brown, Jackson, Boettcher & Dienner
Attys.

62. REFRIGERATION.
171

Examiner

Aug. 17, 1937. R. B. P. CRAWFORD Re. 20,469

REGENERATIVE AIR CONDITIONING SYSTEM

Original Filed Feb. 23, 1932 3 Sheets-Sheet 2

Inventor:
Robert B. P. Crawford
By Brown, Jackson, Boettcher & Dienner
Att'ys.

62. REFRIGERATION

Examiner

71

Aug. 17, 1937. R. B. P. CRAWFORD Re. 20,469

REGENERATIVE AIR CONDITIONING SYSTEM

Original Filed Feb. 23, 1932 3 Sheets-Sheet 3

Inventor:
Robert B. P. Crawford
By Brown, Jackson, Boettcher & Dienner
Attys.

62. REFRIGERATION.
171
Examine

Reissued Aug. 17, 1937

Re. 20,469

UNITED STATES PATENT OFFICE 20,469

REGENERATIVE AIR CONDITIONING SYSTEM

Robert B. P. Crawford, New York, N. Y.

Original No. 2,057,938, dated October 20, 1936, Serial No. 594,754, February 23, 1932. Application for reissue March 15, 1937, Serial No. 131,102

65 Claims. (Cl. 62—171)

This invention relates to air conditioning systems, and more particularly to air conditioning systems of a regenerative type.

In the preferred embodiment of my invention, I provide cooling, dehumidifying and dehydrating means which are regenerative in character, and which function without the utilization of any additional energy except that produced by the constituents themselves, and in which no accessory apparatus is necessary.

In air conditioning systems of the type that are now in use, it is customary to use cooling coils which are maintained at a relatively low temperature by the use of a liquid or gaseous refrigerant, such as compressed carbon dioxide, ammonia gas, or the like. This necessarily requires a motor driven compressor, a cooling condenser, and expansion coils or the like. Such a cooling system is expensive to install and expensive to maintain. Further, the refrigerant in such a system is costly, and must be periodically replaced.

The purpose of refrigerating coils or cooling coils, in most instances, has been twofold. Firstly, they are used for dehumidifying both unconditioned fresh air and also return air. Secondly, in air conditioning systems which are used for both heating and cooling, the coils may be used for cooling the conditioned air before it reaches the delivery duct. This necessitates a rather expensive cooling system of proportionate size for air conditioning systems of any considerable capacity.

Further, effective and efficient dehumidification of air by washing it with cold liquids, or by passing it over refrigerating coils, is not possible, since in cool weather the unsaturated dehumidified air must then be heated to the proper temperature before entering the delivery duct. In cold weather, the per cent of saturation in the air, or its humidity, is low, and to chill it still lower in order to increase the unsaturation thereof is expensive when re-heating must be considered. In hot weather, the degree of saturation is relatively high, and increased cooling is necessary in order to dehumidify the air for properly conditioning the same.

I propose, therefore, to provide an air conditioning system that eliminates the necessity of providing refrigerating coils, and outside refrigerating systems, such as compressors and associated apparatus, but which will still retain all the functions heretofore provided by such refrigerating units. In connection with this feature, I employ what I term a "regenerative cooling" system, that is, one in which the cooling part of the system is automatically regenerative, and a continuous flow is established by which the cooling medium, preferably ordinary water, is continuously passed through a regenerating cycle.

Thus I provide a cooling tower, having spray nozzles at its upper end, and a sump at its lower end. Intermediate the ends, and preferably adjacent the lower end, a fresh air inlet is provided which permits air to pass into the interior of the tower. An exhaust fan withdraws the air from the tower at its upper end. Connected to the spray nozzles is a pipe leading from the cooling coils which are placed in the air conditioning system adjacent, but anterior to the delivery duct. The other end of the coil is connected to the bottom of the sump, and a suitable pump is provided for maintaining circulation. The air to be cooled passes over the extended surface of the coil, and, in being cooled, gives up its heat to the fluid in the coil. This warmed fluid is discharged in the form of a spray down through the upward draft of air in the cooling tower, and is progressively cooled, reaching a temperature approximating the wet bulb temperature of the air as it reaches the bottom of the tower. By placing the discharge or spray pipes in position relative to the temperature of the fluid therein, with the one having the highest temperature disposed at the top of the tower, and the others arranged in descending order beneath them, a true counter-current effect is produced, which results in more efficient cooling. The cooled water is then withdrawn by means of a pump and forced back into the cooling coils adjacent the delivery duct. Thus the cycle is continuous, and the water is continually cooled in the tower, then circulated to absorb the heat from the conditioned air, and again returned to the tower for cooling.

If desired, I may also provide, in this cycle, a set of coils, disposed as a by-pass between the top of the tower and the bottom thereof, which are positioned in the path of the fresh air inlet to the tower. These coils serve to pre-cool the air before it enters the tower. By providing such a by-pass, I am able to obtain an increased cooling of the water, so that there will be a more effective cooling of the conditioned air before it enters the delivery duct.

It will thus be apparent that, in providing this feature, I am able to eliminate the necessity of providing refrigerating apparatus, or other cooling means for cooling the conditioned air before it is delivered to the room or space desired.

Referring now to the means for dehumidifying the fresh unconditioned air, this has ordinarily been accomplished, as pointed out above, by chilling the air through the medium of refrigerating coils, cold water sprays, or the like, to condense out the moisture and increase the saturation of the air. However, such methods of dehumidification have numerous disadvantages, such as cooling the air to an extremely low temperature in order to remove the required amount of moisture, which necessitates increased heating of the air at a later stage of the conditioning process.

I therefore contemplate the provision of suitable dehydrating means for performing this dehumidification, whereby the moisture contained in the air is absorbed by a suitable material, such as a chemical absorbent. Various chemical solutions, such as prestone, ethylene-glycol, glycerin, soluble oils, or some of the hygroscopic salts, such as the chlorides of lithium, calcium or zinc, may be employed. Also, I contemplate the use of dry adsorbents, such as silica gel, green sand, and the like, wherein the incoming air is passed over the adsorbent and the moisture thereby removed into the surface of the adsorbent.

It is to be noted, in connection with employing dehydrating means of this type, that the temperature of the air is slightly increased as it is dehydrated. For instance, air entering such a dehydration chamber at 100 degrees dry bulb and 54 degrees dew point will leave the chamber having a temperature of about 120 degrees dry bulb, and will have a dew point of approximately 30 degrees. In cold weather, this is especially advantageous, since it provides means for heating the air at the same time that the humidity is decreased.

In a dehydration process of this type, some means must be provided for the removal of the water absorbed from the air, in order that the dehydrating solution or adsorbent will function at its maximum capacity. The apparatus for performing this removal must be that which is suited to the type of dehydrator used. In considering this problem, the dehydrators fall into three general classifications. These are as follows:

1. Electrolytic absorbents such as chlorides of lithium, calcium and zinc, caustic soda, potash.

2. Non-electrolytic absorbents such as prestone, ethylene-glycol, di-ethylene glycol, glycerin, tartaric acid, carbon tetrachloride, soluble oils and gelatin solutions.

3. Dry adsorbents, such as silica gel and green sand.

Considering the electrolytic dehydrators, these are provided in solution form, and the solutions are sprayed into the path of the incoming air stream and are collected in a suitable sump provided for that purpose, together with the water absorbed by them. By providing a suitable outlet connection, these absorbents may be conducted to an electrolyzing cell, which cell is provided with the usual anode and cathode. A suitable potential is established between the anode and the cathode, and the water in the solution is thus electrolyzed into its component constituents, namely, hydrogen and oxygen. These may be conducted away, or may be collected in suitable containers. The cell receives its energy from a suitable source of electric current, and I preferably provide a switch operated by a suitable hydrometer, which switch is capable of establishing the potential across the cell whenever the water in the solution is such that the specific gravity of the solution causes the hydrometer to rise or fall to close the electrical circuit. The water is thus removed, and the dehydrating solution is kept at its maximum absorbing capacity.

If the solution is non-electrolytic, the water may be separated by either osmosis or by mechanical separation. For instance, the outlet leading from the collecting sump may have an osmotic membrane placed therein, and a suitable electrical potential may be established at a point posterior to the membrane, this potential causing the water in the solution to pass through the membrane and to thus be removed from the solution. The water may then be drained away. This forms an effective means of removing the water from non-electrolytic solutions, so that the solutions will function properly at all times. If desired, the membrane can be inserted between the strong solution and the weak solution of the dehydrators, and the water can be removed from the concentrated portion of the solution by heating or other means, thus requiring no pumps between the strong solution and the weak solution.

The water may also be removed by drawing a portion of the solution into a tank that is then subjected to heat from a suitable heater, steam coils, or the like, which will evaporate the water. This heat energy is supplied by the power plant of the building, or by separate heating means, depending upon the situation in a particular installation.

If the dry adsorbents, such as silica gel or green sand, are used, I preferably provide a battery of dehydrating chambers, and while the incoming air is passed through one of the dehydrating chambers, wherein the moisture is removed from the air, another of the dehydrating chambers is being subjected to a flow of hot dry air to remove the absorbed moisture therefrom. This moisture is removed by a process of evaporation, and when one of the dehydrating chambers has absorbed its capacity of moisture, it is cut out from the conditioning system, and another dehydrating chamber is utilized to absorb the moisture of the incoming air. The first dehydrating chamber is then subjected to a hot dry blast from a hot air furnace or the like, and the moisture is evaporated therefrom, leaving the adsorbent dry. The adsorbent is then cooled so that it will retain its maximum absorbing characteristics.

If desired, combinations of the electrolytic, osmotic, and mechanical methods may be used for removing this water. It is apparent that as long as the water is removed from the solution as it is being absorbed, the solution will retain its maximum absorbing characteristic, and will thus function continually in a very efficient manner.

A further feature of my invention resides in the provision of a plurality of cooling towers, each having a separate regenerative cycle. In this embodiment, the cycle of one of the cooling towers is at a higher temperature than in another of the towers, and the water circulating in this cycle is used for pre-cooling the incoming fresh air for the conditioning system, and also for pre-cooling the incoming air entering the cooling tower. The other of the cycles is used for cooling the mixture of fresh and return air immediately before the conditioned air enters the delivery duct, and for cooling, to a further extent, the incoming air leading to its particular tower. In this manner, the second of the cooling towers is operating at

62 REFRIGERATION.
71 a temperature considerably below that existing in the fluid circulating in the first of the cooling towers. It is thus possible to obtain a lower temperature, and consequently a lower dewpoint, in the air passing through the conditioning system.

Suitable control means may be provided for controlling the quantity of air passing through the tower, or for regulating the circulation of water in the system. The control means may be actuated, if desired, in accordance with the temperature existing within the water collected in the sump at the bottom of the cooling tower, altho the particular location of the actuating means is optional.

A further use of this embodiment is the provision of means located adjacent the upper end of the second of the cooling towers for cooling the hot solution as it comes from the solution tank, and also for cooling the solution in the dehydration chambers. By maintaining the solutions in the dehydrators cooled, their absorbing capacity is increased, and they function at a higher absorbent rate.

Other objects and advantages of my invention will appear more fully from the following detailed description, which, taken in connection with the accompanying drawings, will disclose to those skilled in the art the particular construction and operation of an air conditioning system such as that outlined above.

In the drawings:

Figure 4 is a detailed sectional view disclosing one method of removing the moisture from the dehydrating solution.

Figure 1:
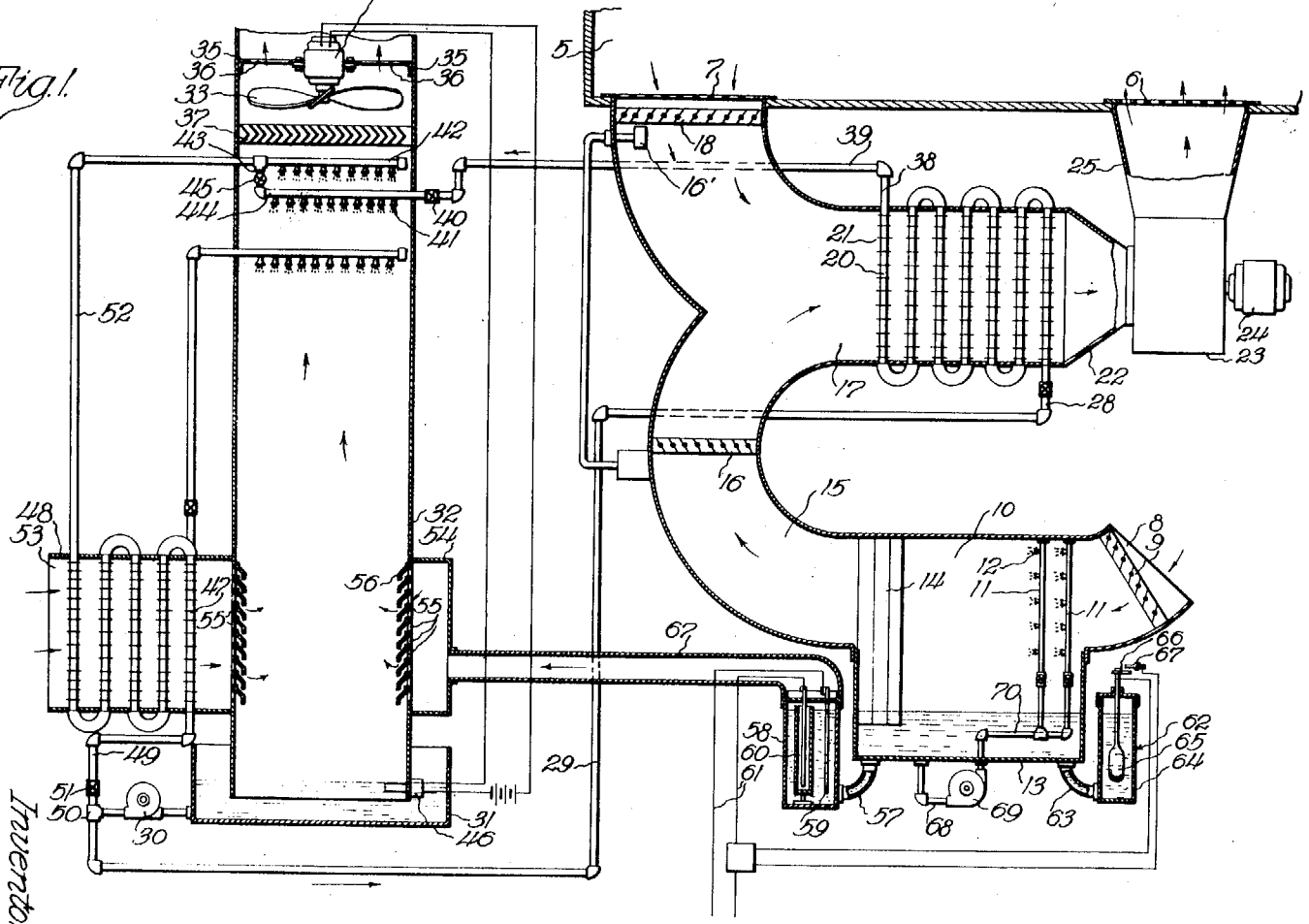
Figure 1 is a diagrammatic sectional view of a simplified embodiment of my invention, wherein the water is removed from the absorbing chamber by means of an electrolyzing cell.

Referring now in more detail to Figure 1, I disclose in this diagram a simplified air conditioning system for supplying conditioned air to a room or other spacial chamber or compartment. This chamber is indicated generally by the reference numeral 5, and is provided with a pair of registers or grilles, the incoming register being indicated at 6, and the exhaust or outlet register being indicated at 7.

The fresh air inlet is indicated generally by the reference numeral 8, and is provided with a suitable damper or closure means, such as the louvres 9, which may be either automatically or manually operated for controlling the quantity of fresh air admitted into the conditioning apparatus. The fresh air enters through the inlet 8, past the louvres 9, and thence directly into the dehydrating chamber, indicated generally at 10. If desired, suitable cooling coils, connected to the regeneration cooling system, can be disposed adjacent the louvres 9 for precooling the air stream. Positioned at the inlet side of this chamber are a plurality of vertically extending pipes, indicated at 11, provided with suitable nozzles or jets 12, which are adapted to spray the air with the dehydrating solution. It is to be understood that the number of spray nozzles, as well as the number of pipes, may be varied as desired, depending upon the capacity of the system, and the amount of dehydration that is desired. These pipes are arranged so that practically all of the air is intimately contacted by the dehydrating solution.

The chamber 10 is provided with a sump 13, which is adapted to collect the sprayed solution and the moisture collected from the air. Positioned at the outward side of the chamber 10 are a plurality of vertically extending baffles 14 which are adapted to remove any entrained particles of solution from the air, so that the air passes into the conduit 15 in a perfectly homogeneous mixture containing no portion of the dehydrating solution. From the conduit 15 the air is led past a suitable damper 16 and is adapted to be mixed with the return air from the room 5 in the conditioning or mixing space indicated at 17.

The quantity of return air is controlled by means of a damper 18, which damper may be automatically or manually controlled. I contemplate, in the present invention, any suitable means for controlling the dampers, and the dampers may be so connected that opening movement of one will cause closing movement of the other. This is all well known in the prior art, and needs no further detailed description. Suffice it to say, in this instance, that the quantity of fresh unconditioned air and the quantity of the return room air is properly proportioned and mixed in the space 17.

This mixture of fresh and return air is then passed over the coils 20, which coils are of appreciable length, and are provided with the extending fin members 21 for the purpose of providing an extended surface contact. As the air passes over these coils, it is progressively cooled, giving up its heat to the fluid circulating in the coils, and in the cooled, conditioned state, passes through the tapered portion 22 of the conditioning apparatus and into the blower 23. A suitable humidity sensing device, indicated at 16', is positioned in the path of the return air stream, and is adapted to regulate the quantity of fresh air being mixed with the return air by regulating the position of the damper 16. This is, however, only one manner in which this control may be effected, and I do not intend to limit my invention thereto. The blower 23 is of any suitable form, and is operated by means of an electric motor or other operating mechanism 24. The air is then blown or forced through the delivery duct 25 and past the grille or register into the room 5.

It will be apparent that the conditioned fresh air, which has had its saturation considerably lowered by passing through the dehydration chamber 10, will mix with the return air, which possesses a higher degree of saturation, and that the combination of these two streams of air will result in an air mixture having the proper degree of saturation or humidity. This humidity, as well as the temperature of the air, may be controlled by controlling the relative proportions of the fresh and return air, since the temperature of these two portions of the air stream may be definitely ascertained, and suitable means may be provided for proportioning these mixtures in accordance with their respective temperatures. For instance, if the fresh incoming air is at a temperature higher than the return air, with a dewpoint considerably lower than that existing in the return air, considerably more return air can be passed into the mixture than will be practicable if the fresh conditioned air is at a lower temperature. This is desirable, inasmuch as in summer, when the incoming fresh air is at a relatively high temperature, its relatively low dewpoint after dehydration, will result in the utilization of a considerable quantity of return air, which return air is at a lower temperature than the incoming fresh air, and will thus lower the temperature thereof. Thus the mixture will possess a lower temperature than the incoming fresh air, but will also possess a lower relative humidity than the return air, which is especially desirable in hot weather.

In cold weather, especially in localities such as the Gulf area, and similar places when it is necessary to heat the fresh incoming air, the return air has a higher degree of humidity, but also has a higher temperature than the fresh air. In this case, a considerable portion of the mixture will consist of return air, inasmuch as this will serve to increase the temperature of the fresh incoming air, while the relatively lower dewpoint of the incoming air will serve to reduce the humidity in the return air and thus provide a desirable condition in the air delivered to the room.

It is thus apparent that I have provided an air conditioning system wherein a relatively large proportion of the return air may be utilized, thus reducing the cost of operating the system, inasmuch as less of the fresh unconditioned air is needed. Also, in the present system, the cooling or heating means provided adjacent the delivery duct need not be of the extreme capacity that is required in prior types of systems.

Referring now in more detail to the cooling coils, indicated at 20, these coils have a suitable valve-controlled inlet indicated at 28. A supply line 29 leads from a delivery pump 30 to the inlet 28. The delivery pump 30 draws water from the sump 31 disposed adjacent the lower end of the cooling tower 32, and delivers this water to the cooling coils 20.

This tower 32 comprises a vertically extending cylindrical shell which has its ends open, the lower end opening into the sump 31. At the upper end, a suitable exhaust fan 33 is provided, this fan being actuated by the motor 34. The motor 34 is supported by means of suitable brackets 35 secured to the wall of the cooling tower shell 32. Suitable openings 36 are provided for permitting air to pass from the interior of the shell outwardly past the bracket members 35. Disposed immediately below the fan 33 is a suitable baffle or eliminator member 37, this member serving to remove any entrained water particles from the air being exhausted from the tower.

The outlet of the refrigerating coil 20 is indicated at 38, and is connected by means of the pipe 39, controlled by the valve 40, to the laterally disposed spray nozzles 41 disposed within the interior of the cooling tower 32. The pipe 42 containing the spray nozzles is connected at its end, by means of the coupling 43 with a second pipe 44 which contains another set of spray nozzles. A suitable valve 45 is adapted to control the connection between these two sets of spray nozzles. The water from the nozzles 41 is discharged downwardly against the upwardly moving stream of air being withdrawn by the fan 33 from the tower, and is progressively cooled, approximating the wet bulb temperature of the air as it nears the lower end of the tower. In certain instances, as pointed out below, the wet bulb temperature of the air is substantially reduced before the air enters the tower, thus effecting a much greater cooling. This water is collected in the sump 31 and is delivered by the pump 30 back into the coils 20. These spray nozzles are so arranged that the pipe containing fluid at the higher temperature will discharge at the upper end of the tower, with the remaining pipes disposed below in accordance with the temperature existing therein. Thus a true counter-current effect is produced.

A thermally sensitive member 46 is disposed in the sump, and is subject to the temperature of the water therein. This member 46 is adapted to control the speed of the motor 34 in accordance with the temperature of water in the sump, for controlling the quantity of air being exhausted from the tower, thus regulating the temperature of the water.

It is thus apparent that I have provided a regenerative circulating system for the cooling systems, wherein the coils are maintained at a definitely determined low temperature by means of discharging the warmed water from the spray nozzles down through the upwardly moving stream of fresh air, thus reducing the temperature in the water.

In the preferred embodiment of my invention, I also employ a series of pre-cooling coils, these coils being disposed in the path of the incoming air stream being supplied to the cooling tower. The coils are indicated generally by the numeral 47 and are positioned in the duct 48 which conducts the fresh incoming air to the cooling tower 32. The coils 47 receive their supply of water from the pipe 49 which is connected at the T connection 50 with the pump 30. A suitable valve 51 controls the quantity of water sent through the coils 47. The other end of the coils 47 lead, by means of pipe 52, to the spray nozzle pipe 44 disposed within the cooling tower. Connected to the first coil of the series of coils 47, as at 52', is a second pipe 53' which is adapted to enter the cooling tower 32 at a point below the spray nozzles 41, and is provided with suitable nozzles for discharging water into the current of air passing upwardly through the tower. This pipe 53' conducts liquid at a cooler temperature than the liquid conducted by the pipe 52, inasmuch as it is positioned at the beginning of the series of coils 47, whereas the pipe 52 is connected at the end of this series, where the liquid has absorbed considerable heat from the entering air stream. Therefore, the liquid discharged from the nozzles carried by the pipe 53' is at a lower temperature than the liquid discharged by the nozzles carried by the pipe 42. For this reason, the counter-current effect is increased, since the colder liquid is discharged at a lower point with respect to the height of the cooling tower.

Referring now in more detail to the conduit 48 for delivering air to the cooling tower 32, this conduit comprises an inlet indicated at 53, and a sourrounding cylindrical portion extending about the cooling tower and indicated by the numeral 54. The cooling tower is provided with a series of openings struck inwardly from the surface, these openings being indicated at 55. A series of downwardly converging fins or flange sections are provided, such as 56, for the purpose of preventing water, discharged from the spray nozzle 41, from entering the openings 55. The air is drawn in through these openings and is drawn upwardly by the means of the fan 33. It therefore comes into intimate contact with the spray of water being discharged downwardly, and the evaporation produced lowers the temperature of the water to a temperature approximating the wet bulb temperature of the air.

For instance, if the entering air at the inlet 53 had a dry bulb temperature of 95 degrees, and a wet bulb temperature of 70 degrees, and if the water returning through the pipe 39 and to the spray nozzles 41 had a temperature of 80 degrees, the air being discharged through the opening 36 would have a wet bulb temperature of 80 degrees, and the water being discharged into the sump 31 would have a temperature of 70 degrees, there being an interchange of temperature between the water and the air. It is thus possible, by means of this cooling tower, to reduce the temperature of the water used to the wet bulb temperature of the unconditioned fresh air, which is considerably below the dry bulb temperature of the air, and thus no refrigerating means for cooling the air is necessary since the water will be at a sufficiently low temperature to perform this function.

Considering now in more detail dehydration chamber 10, this chamber is provided, as pointed out above, with a sump or discharge portion 13. A suitable discharge outlet 57 is provided for the purpose of withdrawing a portion of the solution from the sump. This discharge outlet 57 leads into an electrolyzing cell indicated at 58, this cell comprising the anode 59 and the cathode 60, these parts being well known and needing no further description. Suitable electrical connections, indicated at 61, are led off from the two poles of the cell, and the energy controlling the cell is actuated by means of a suitable hydrometer switch, indicated in its entirety by the reference numeral 62.

This switch 62 comprises an outlet 63 leading from the sump 13 to a suitable container 64 which is provided with an hydrometer float 65. The upper end of the hydrometer float has an electrical contact member 66, which is adapted to make contact with a suitable contact member 67' positioned either above or below the cell so that upon movement of the hydrometer 65 an electrical contact will be made to actuate the cell 58. Thus, as the water in the dehydrating solution increases, the specific gravity thereof decreases causing the hydrometer to sink and make contact, this contact energizing the cell 58 and thus producing electrolytic action in the cell. If a solution is used which has a specific gravity of a value less than that of water, wherein the addition of water serves to raise the specific gravity, the hydrometer switch can be so arranged as to make contact when the hydrometer rises. This electrolyzes the water into its constituent components, namely, hydrogen and oxygen, which are discharged into the duct 67, which leads into the cooling tower 32. If desired, the respective constituents may be collected in suitable containers instead of being transmitted to the tower. Also the hydrogen and oxygen may be recombined to recover the energy thereof, which may be returned to the circuit. In combining the hydrogen and oxygen, I have found that they can be burned together to reunite into water, and that the intense heat produced thereby may be utilized for further vaporization of water in the solution.

As shown, there is provided a suitable outlet from the bottom of the sump 13, indicated at 68, which leads to the inlet side of a pump 69, the pump 69 having its outlet connected to pipe 70 to the pipes 11 and spray nozzles 12. This pump provides the necessary circulation for forcing the solution in spray form from the duct 12 into the path of the air stream.

If the dehydrating solution used is electrolytic, the above method will result in the removal of the absorbed water therefrom, thus maintaining the solution at its maximum absorbing capacity. However, if the solution is non-electrolytic, that is, if the solution is composed of prestone, ethylene-glycol or glycerin, or soluble oils which are non-electrolytic, osmotic separation is the most efficient. I contemplate using this method for removing the water in systems employing non-electrolytic dehydrators.

Referring in detail to Figure 4, I have disclosed therein the sump 13', which has an outlet 57' leading therefrom. Positioned in the outlet 57' is a suitable membrane, made of any animal, mineral or vegetable tissue of porous construction. This membrane 71 is securely clamped in the outlet 57' and any liquid that passes to the electrolyzing cell 58' must pass through the membrane. The cell has the usual anode 59' and the cathode 60', which are suitably connected to a source of electrical current for establishing a potential between the two poles. A hydrometer switch, such as the switch 62 of Figure 1, may be provided for making and breaking contact to energize the cell.

It is well known that if a solution is non-electrolytic, the establishing of an electrical potential upon the opposite side of a membrane will cause the water in the solution to pass through the membrane toward the source of the electrical potential. Therefore, in this embodiment, the water passes through the membrane 71, and enters into the electrolyzing cell 58'. In this cell the water may be disposed of by being drained away through a suitable overflow pipe 72. It is to be understood that any suitable means may be employed for disposing of the water thus separated.

If desired, a portion of the solution, if it is a salt solution or the like, may be removed to a suitable container, where heat is applied, as by means of a heater, steam coil, or the like, and the water is evaporated leaving the concentrated dehydrating solution, which is returned to the dehydrator.

Figure 2:
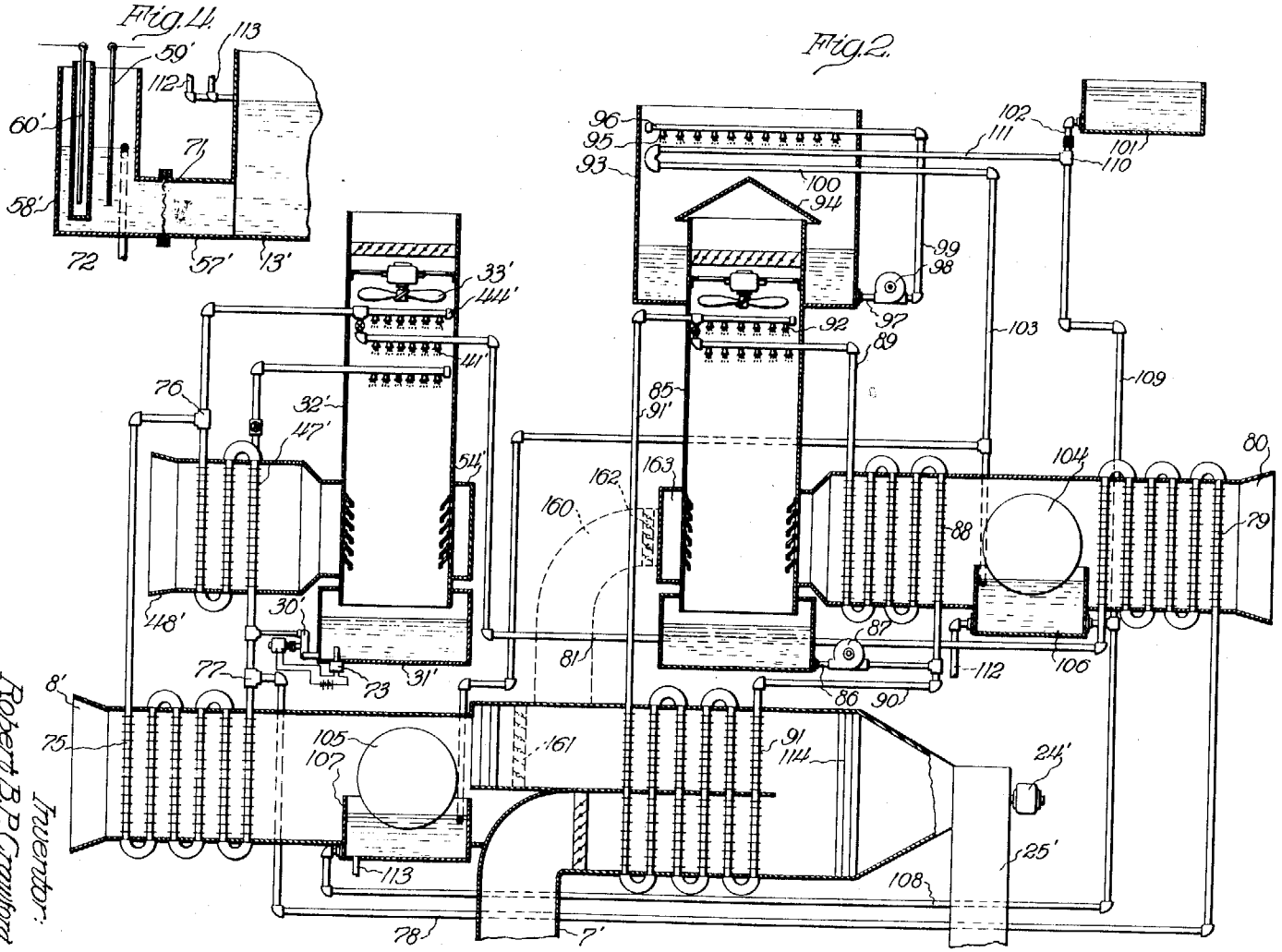
Figure 2 is a diagrammatic sectional view illustrating the use of two cooling towers, and also disclosing the manner of cooling the dehydrating solution.

Referring now to the embodiment disclosed in Figure 2, in which embodiment I have disclosed the use of a plurality of cooling coils the fresh air inlet is indicated by the numeral 8'. The return air inlet is indicated by the numeral 7' and the delivery duct is indicated by the numeral 25'. A suitable motor 24' is provided for the purpose of drawing the air through the conditioning system and forcing it through the delivery duct 25'.

In this embodiment, I have disclosed a cooling tower 32' similar to the cooling tower 32 of Figure 1, and provided with the sump 31' and the exhaust fan 33'. This cooling tower is provided with the fresh air inlet 48' and has the surrounding cylindrical conduit portion 54' for permitting air to enter at all sides of the cooling tower 32'. This inlet 48' has the pre-cooling coils 47' disposed therein, these coils corresponding to the coils 47 of the embodiment shown in Figure 1. A pump 30' is provided for the purpose of maintaining the circulation in the regenerative cycle of this system.

However, in this embodiment, an additional set of pre-cooling coils, indicated at 75, are provided for the purpose of pre-cooling the fresh unconditioned air as it enters the inlet 8' of the air conditioning system. These coils 75 are bypassed from the regenerative cycle of the cooling tower 32′ and reenter through the T connection 76 and from there are led to the pipe 44′ corresponding to the pipe 44 of Figure 1. Another T connection 77, spaced from the outlet pipe of the pump 30′, leads through the pipe 78 to the coil 79, positioned in the fresh air inlet 80 leading to a second cooling tower 85. From the end of this coil, the water is led back through the pipe 81 to the nozzles 41′, corresponding to the nozzles 41 of Figure 1. This cycle is regenerative in that the water is forced through the various coils and is discharged at the top of the cooling tower, is then cooled by contact with the upwardly moving stream of air, and is withdrawn out of the sump 31′ by means of the pump 30′ and forced into the respective cooling coils.

Referring now in more detail to the second cooling tower, indicated at 85, this cooling tower is provided with an exhaust fan similar to the exhaust fan 33′ of the first cooling tower, and in all general respects is a duplicate of the tower 32′. The outlet from the sump of this tower is indicated at 86, and leads to a pump 87 positioned adjacent the tower. From the pump 87, the fluid, preferably water, is forced through the coil 88 positioned in the path of the air stream leading to the cooling tower, and is led back by means of the pipe 89, to suitable discharge nozzles located within the cooling tower. Another portion of the fluid discharged by the pump 87 is led by means of the pipe 90 to the cooling coils 91 located in the path of the fresh and return air streams, and positioned adjacent, but anterior to the delivery duct. From these coils, the fluid is led by means of pipe 91′ to the top of the cooling tower and is discharged therein through suitable nozzles 92. It is thus apparent that the cycle of this system is regenerative also, and corresponds generally to the cycle of the system disclosed in connection with the cooling tower 32′.

However, it will be noted that the upper end of this tower opens into a cylindrical tank 93, and that air discharged from the tower 85 is deflected out of the sides of the hood 94 and passes upwardly past the spray nozzles 95 carried by the pipe 96. The bottom of the tank 93 forms a sump, and a suitable outlet 97 is provided leading from the sump to a pump 98. The outlet side of the pump 98 is connected, by means of the pipe 99, to the pipe 96 carrying the spray nozzles 95. It is thus apparent that the fluid in the tank 93 is continuously withdrawn from the sump and discharged at the top of the tank. This, also, is a regenerative cooling cycle.

The spray nozzles 95 are directed to discharge directly upon a coil 100 located adjacent the top of the tank 93, the coil 100 containing the dehydrating solution coming from the solution tank 101. The solution in this tank 101 is at a relatively high temperature, due to the chemical reaction accompanying the formation of the dehydrating solution, and some means must be provided for cooling the solution before it is delivered to the dehydrators.

I have therefore provided, leading from the outlet 102 of the tank, a suitable T connection whereby the solution is led over the coil 100 and then downwardly through the pipe 103 to the dehydrators 104 and 105, the dehydrator 104 being placed in the path of fresh air stream leading to the cooling tower 80′ and the dehydrator 105 being placed in the path of the fresh air stream leading to the conditioning system. It is to be understood that the dehydrator 105 may be eliminated, if desired, as it sometimes is unnecessary to have a dehydrator in the air-conditioning system.

These dehydrators 104 and 105 are similar in construction, and comprise rotating disk members which have the lower periphery of their surfaces dipping into the dehydrating solution carried in the tanks 106 and 107. From the tanks 106 and 107 the dehydrating solution is led back to the pipes 108 and 109 to a T connection 110 located adjacent the solution tank. This T connection 110 comprises, preferably, a swing check valve which permits solution in the pipe 109 to enter the pipe 111 leading to the coil 100, but does not permit solution leaving the tank 101 by means of the outlet pipe 102 from passing into the pipe 109. In this manner, the dehydrating solution in the tanks 106 and 107 is maintained at a relative cool temperature at all times. The tanks 106 and 107 have secondary outlets 112 and 113 which lead to suitable sumps, such as the sump 13′ illustrated in Figure 4, for removing the water from the dehydrating solution. It is thus possible to maintain the solution in the tanks 106 and 107 both cool and relatively concentrated at all times.

In operation, the conditioning system disclosed in Figure 2 is capable of cooling the air to a considerably greater extent than is possible in the single cooling tower system of Figure 1. It will be noted that the cooling tower 32′ corresponds in practically all respects to the cooling tower 32 of Figure 1.

In order to illustrate the manner in which this system functions, I shall disclose its operation in connection with certain specified temperature conditions as they might actually exist in practice. For instance, assuming the outside unconditioned air to be at a dry bulb temperature of 95°, a wet bulb temperature of 75°, and a dew point of 66°, which is a condition which occurs regularly during warm weather, this air first of all encounters the coils 47′ of the cooling tower, and is reduced to about 80° dry bulb temperature, 70° wet bulb temperature, and approximately the same dew point. This means that the water leaving the coils 47′ is also at a temperature of about 80°. Therefore, the water discharged from the nozzles 41′ is at a temperature of about 80°, and after passing through the air stream, the water withdrawn from the sump 31′ is at a temperature of about 70°, the wet bulb temperature of the air stream. The air entering the inlet 8′ of the conditioning system passes across the coils 75, which are at the relatively low temperature of 70°, and this air is cooled down to about 80°, the water being discharged from the coils to the pipe 44′ being raised to a temperature of approximately 80°.

Thus it will be apparent that the fresh air entering the inlet 80 of the second cooling tower will be cooled to about 80° before it enters the dehydrator 104, since it passes over the coils 79 connected into the cycle of the tower 32′. In this dehydrator 104, the air is heated due to the absorption of the water, but the dew point is decreased from, quoting from a typical example, 66 degrees to 38 degrees. This relatively cool dry air is passed by the coils 88 into the cooling tower 85, and because of the low dew point, the wet bulb temperature of this air is reduced in the dehydrator, to approximately 58°. This air is discharged upwardly against the spray nozzles 92, and the water discharged from these nozzles has its temperature lowered to approximately 58° by the time it reaches the sump. This water, at 58° passes through the coils 88, and, after the system 62. REFRIGERATION
Examin has once been put into operation, will serve to further cool the dry air, resulting in further cooling of the water discharged through the cooling tower.

The water leaving the pump 87', at this lower temperature, approximately 58°, passes through the coils 91 disposed n the path of the fresh and return air streams, and serves to cool these air streams to about 65° dry bulb temperature. This water is then led back, at a temperature of about 65°, and is discharged into the top of the cooling tower. The water passing downwardly in the tower is cooled to a temperature approximating the wet bulb temperature of the air passed into the cooling tower, or about 58°, and this cycle continues as long as the system is in operation.

Thus it is apparent that the cycle of the cooling tower 85 is also regenerative, and that the water within this tower will be cooled to an appreciably greater extent than the water in the tower 32'. By this disposition of the two cooling towers, I am able to effect a much greater refrigerating or cooling effect upon the air stream than is possible in the disclosure of Figure 1, which is of considerable importance in air conditioning systems of relatively large capacity. It is to be noted, in this connection, that each of the cooling towers has its own independent regenerative cycle, and that one can be cut out of the system without materially affecting the operation of the other. Further, the use of this type of cooling system eliminates the necessity of employing artificial refrigerating systems. The entire cooling system is self-contained, and employs no accessory equipment such as would be necessary in systems that are now in common use.

Referring now to the cycle of the air stream as it enters the inlet 8', this air is cooled by passing over the coils 75, and leaves the coils at approximately 80°, if, as before stated, the air is at 95° dry bulb, 75° wet bulb and 66° dew point. The air then passes through the dehydrator 105, and its dry bulb temperature is increased to 82°, but the dew point is reduced to 38°. This air, at its relatively low dew point temperature of 38°, is then cooled by passing it over the coil 91, and is mixed, by means of the baffle 114, with the return air from the room or other compartment and from there passes to the delivery duct 25'. The return air, entering the inlet 7' is at approximately 80° dry bulb and 59° dew point. After passing through the coil 91 and being mixed with the relatively low or unsaturated fresh air, the final condition of the mixed air stream as it passes into the delivery duct is 65° dry bulb and 55° dew point, which means that the air is in relatively cool unsaturated state as it is delivered to the room.

Suitable means may be provided for controlling the relative proportions of fresh air and return air admitted into the conditioning system, as described in connection with the embodiment disclosed in Figure 1. Also, suitable valves may be provided in the water circulating system so that any of the individual coils may be shut off, if desired. In connection with this feature, I provide further a thermally sensitive member 73, similar to the member 46 of Figure 1, which is responsive to the temperature of the water in the sump, and which is adapted to control the speed of the pump to regulate the circulation of the water. A similar device may be applied to the cooling tower 85.

If desired, the system disclosed in Figure 2 may be modified, as indicated in dotted lines, by providing the conduit 160, which leads from the primary air inlet of the second cooling tower 85 into the main air conditioning unit. The air entering through the inlet 8' is then shut off by means of the baffles 161, and the pre-cooled conditioned primary air entering the inlet 80 is conducted through the conduit 160 into the air conditioning system and thence through the delivery duct 25' to suitable air wells or delivery shafts in the buildings, such as elevator shafts, stairway shafts, or the like. This air is delivered under a sufficient pressure to prevent infiltration of outside air into the building, and provides outfiltration of this conditioned cooled air through the window cracks and the like, the air in the building being maintained under a pressure greater than the pressure of the outside air. This air is at a wet bulb temperature considerably lower than the wet bulb temperature of the air which would pass through the air inlet 8' and past the dehumidifier 105, since it is subjected to additional cooling by passing the cooling coils 88.

Since the water in the cold tower can never be at a temperature below the wet bulb temperature of the air entering the tower, and the dew point of this air is considerably lower than the wet bulb temperature after the air has passed through the dehumidifying means, the dew point temperature of the air delivered to the delivery duct or to the elevator shafts or the like, has a dew point considerably lower than the wet bulb temperature of this air, which means that the dew point is considerably lower than the temperature of the water circulating through the coils 88.

The cooling coil 91 is removed, in this modification, from the air conditioning system, and is utilized to provide individual unit coolers in each room of the building in which the system is installed. Since the temperature of the water in these coils is considerably higher than the dew point of the air being delivered to these rooms, since it is at the wet bulb temperature of the air, there will be no condensation of moisture upon the cooling units in each of the rooms, and thus the provision of drains for removing this condensation is eliminated. A suitable baffle 162 may be provided for the purpose of conducting the air from the primary air inlet to the second cooling tower 85 to the conduit 160 when it is desired to utilize this modified form of system.

The dehumidified air passes through the annular chamber 163 surrounding the cooling tower 85 and a portion thereof passes through the baffle 162 into the duct 160. The other portion thereof passes into the interior of the tower and is exhausted upwardly therethrough. It is not possible to draw air from the interior of the tower into the duct 160, the exhaust fan placed in the top of the tower drawing air into the tower.

Figure 3:
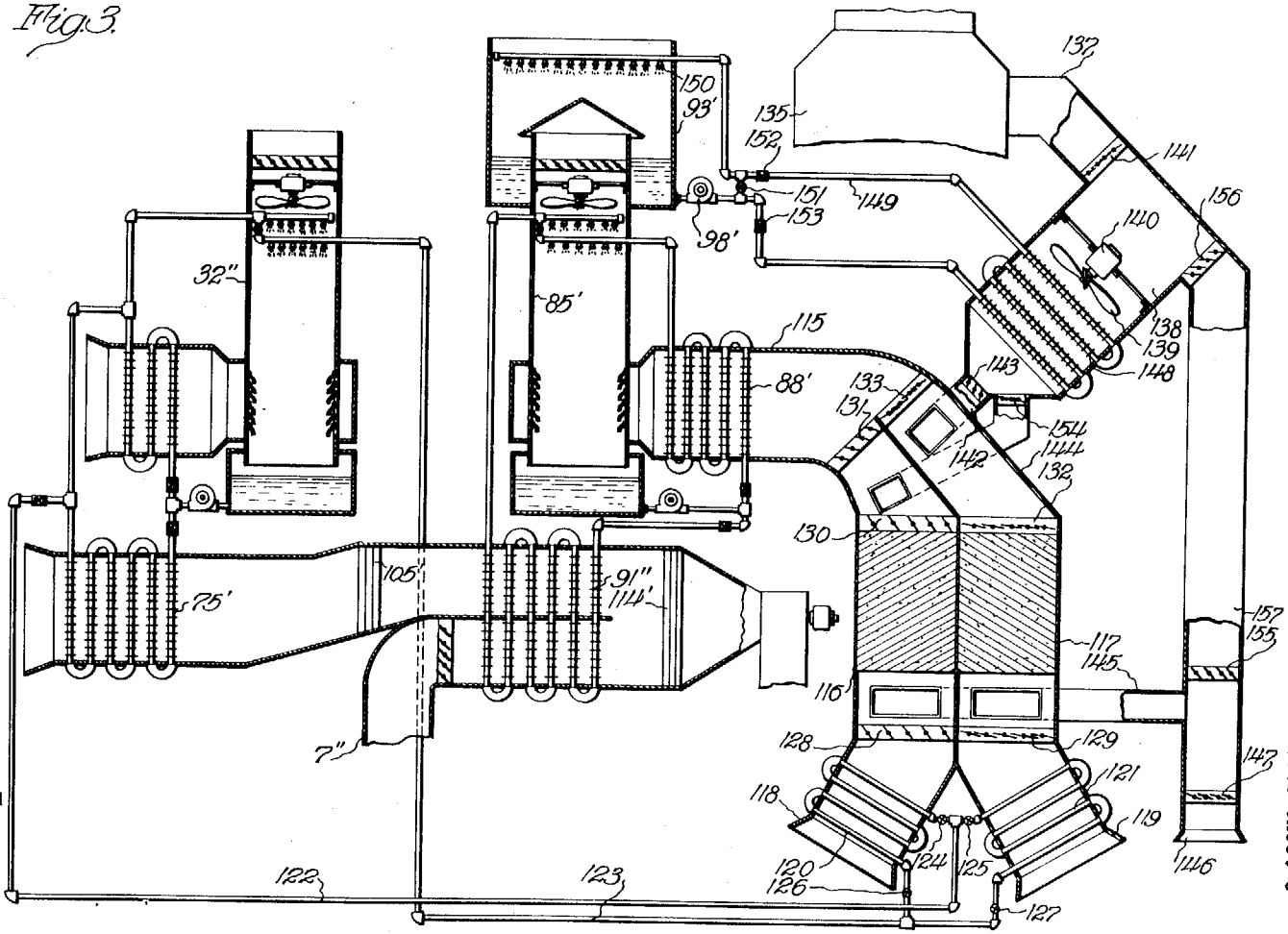
Figure 3 is a modified diagrammatic view illustrating the invention as applied to a system using a dry adsorbent.

The embodiment disclosed in Figure 3 is similar in its more important aspects to that disclosed in Figure 2, but differs therefrom in utilizing a dry adsorbent, such as silica gel or green sand, for the dehydrating agent disposed in the path of the fresh air stream leading to the second cooling tower. Inasmuch as the remaining parts of the system are described fully in connection with Figure 2, it is not believed that it will be necessary to describe them only as they are connected with that part of the system which is modified in Figure 3.

Referring in more detail to Figure 3, I have indicated the inlet to the second cooling tower by the reference numeral 115. This inlet is provided with the usual coil 88', corresponding to the coil 88 of Figure 2, and in all other respects the cooling tower itself is the same as the cooling tower 85 disclosed at Figure 2. Leading into the conduit or inlet 115 are a series of dehydrators, comprising individual dehydrating chambers, such as the chambers 116 and 117. These chambers have individual inlet openings 118 and 119.

Disposed in the openings 118 and 119 are individual cooling coils 120 and 121 which are connected by means of the pipes 122 and 123 to the regenerative cycle of the cooling tower 32''. These coils 120 and 121 correspond generally to the coil 79 of Figure 2, and suitable valves such as the valves 124 and 125 cooperate with the valves 126 and 127 for selectively utilizing either the coil 120 or the coil 121. Positioned in the respective compartments in the rear of the coils 120 and 121 are suitable dampers 128 and 129 which are adapted to close off the flow of air through the dehydrating compartments. For instance, if the compartment 116 is to be used the valves 125 and 127 are closed, and the damper 129 is closed. This permits the coil 120 to receive all of the cooling fluid, and the damper 128 is in open position to permit flow of air through the compartment 116. When it is desired to use the compartment 117, the arrangement is reversed, the valves 124 and 126 being closed, and the damper 129 being in open position.

Disposed within each of the compartments 116 and 117 are the dry adsorbents, such as silica gel or green sand. These adsorbents are capable of removing moisture from the air as it passes thereover, and thus reduce the quantity of moisture that is conducted to the cooling tower 85'. Positioned adjacent the compartments 116 and 117, between these compartments and the duct 115 are a pair of cooperating dampers 130, 131, which are in open position when the compartment 116 is being used. A corresponding pair of dampers is provided for the compartment 117, these dampers being indicated at 132 and 133. It will be noted that the dampers 132 and 133 are closed when the compartment 116 is being used.

In using a dry adsorbent as a dehydrating agent, it becomes necessary to remove the moisture from the adsorbent after the compartment has been in use for a certain period of time, inasmuch as the absorbing capacity of the adsorbent is diminished in proportion to the amount of moisture that is absorbed.

I have therefore provided a plurality of these compartments. In this modification there are two such compartments shown, but I desire it understood that as many compartments as desired may be provided. While one of the compartments, such as the compartment 116, is in use, the other compartment is being utilized to remove the adsorbent moisture from the dehydrating agents, so that when the dehydrating agent in the compartment has absorbed its capacity of moisture, it may be closed off and the other compartment may be utilized for this purpose.

In order to remove this moisture, I preferably provide means for passing a blast of hot dry gases from a suitable furnace or the like into the compartment and forcing it through the silica gel or green sand to absorb the moisture therefrom, by means of evaporation. Such a furnace is indicated by the numeral 135.

This furnace is provided with a suitable conduit 137 leading to the chamber 138. Disposed within the chamber 138 is a fan 139, preferably operated by means of the motor 140. A damper 141 is provided for the purpose of controlling the flow of hot gases through the conduit 137 to the chamber 138. From the chamber 138, the hot gases pass through the conduit 142, the entrance of which is controlled by the damper 143, to the interior of the intermediate duct 144.

During this period, the damper 133 is in closed position, and the damper 132 is open. The hot gases then pass from the conduit 142 through the intermediate chamber 144 and past the dry adsorbent in the compartment 117, and from there are conducted to the outside atmosphere by means of the conduit 145 and the outlet 146, the damper 147 being opened for this operation. These hot gases from the furnace thus evaporate the moisture absorbed by the dehydrator 117, and pass to the outside carrying this entrained moisture in the form of vapor.

After a suitable period of time, during which the moisture is all removed from the dehydrator in the compartment 117, the hot gases are passed over the coils 148 disposed in the chamber 138. These coils receive their coolant from the cylindrical tank 93' mounted adjacent the upper end of the cooling tower 85'. The pump 98' is adapted to force the water collected in the lower portion of this tank through the coils and the water is then led back through the pipe 149 to the spray nozzles 150 disposed at the upper part of the tank. These spray nozzles discharge against the exhaust air from the tower 85' and the water is cooled thereby before it is delivered to the coils 148. A suitable by-pass, controlled by the valve 151, is provided for the purpose of by-passing the cooled liquid when it is desired to put the coil 148 out of operation.

Thus, I first pass the hot dry gases from the furnace 135 over the adsorbent in the compartment 117, and after the moisture has been evaporated from this adsorbent, I open the valves 152 and 153 and allow the hot dry gases to pass over the cooling coil 148, these gases being then recirculated back through the conduit 157 to effect a continuous cycle of cooled dry air for cooling the adsorbent, the dampers 155 and 156 being opened, and the dampers 141 and 147 being closed. This serves to cool the dry adsorbent down to a temperature where it will retain its maximum absorbing characteristics.

When the adsorbent in the compartment 117 has been dried and cooled, I shut off the damper 128 and open the damper 129, and also close the damper 143 and open the damper 133. The dampers 131 and 128 being closed, no air will be permitted to flow through the compartment 116, and the flow will be maintained through the compartment 117. The valves 124 and 126 are then closed and the valves 125 and 127 are opened, to permit the cooling coil 121 to operate. The fresh air inlet to the cooling tower 85' then enters at the inlet 119, passes over the coil 121, then passes over the dehydrating agent in the compartment 117, past the damper 132, and past the damper 133 into the duct 115. From the duct 115 it enters the cooling tower.

At the same time, I open the valve 151 and close the valves 152 and 153, thereby cutting off the flow of cooling liquid to the valve 148. I then open the damper 154, and permit the hot dry gases from the furnace 135 to enter the compartment 115. The damper 128 being closed, these gases evaporate the moisture from the dehydrating agent in this compartment and pass out to the atmosphere through the conduit 145 and the outlet 146. After the moisture has all been evaporated, I close the valve 151, open the valves 152 and 153, and permit the hot dry gases from the furnace to be cooled so as to cool the adsorbent in the compartment 116.

It is thus apparent, that while I am utilizing one of the compartments containing the dehydrating agent for the purpose of removing moisture from the air, the adsorbent in the other compartment is thoroughly dried and re-conditioned to place it in readiness for subsequent use. It is thus apparent that at all times there will be one dehydrating chamber in readiness for use the moment the other one becomes inefficient due to the absorption of too much moisture.

The conditioning system disclosed in this embodiment corresponds to the conditioning system disclosed in Figure 2, and needs no detailed description. Suffice it to say that the air is initially cooled by the coil 75' and is then passed through the baffles 105'. This cooled air is then passed over the coil 91'' and is mixed with the return air entering the conduct 7''. This mixed air is then led past the baffle 114' and into the delivery duct.

It is to be understood that various modifications and rearrangements of the individual parts of each of the air conditioning systems disclosed in the accompanying drawings may be made without departing from the spirit of my invention, as I do not intend to be limited to the exact arrangement disclosed. The primary object of my invention is to provide an air conditioning system wherein the cooling will be effected by means of what I term a regenerative cooling cycle, such that there will be no necessity of the use of outside refrigerating systems, which are expensive to install and expensive to maintain.

I therefore do not intend to be limited to the exact embodiment of my invention disclosed in the drawings, but only insofar as defined by the scope and spirit of the appended claims.

I claim:

1. The method of cooling water which comprises discharging a spray of water downwardly through an upwardly moving stream of air, collecting said discharged water, recirculating said water through coils into countercurrent contact with an air stream, and conducting said water back after it has absorbed heat from a second air stream to re-discharge it through said first air stream, said water being discharged from different levels in said tower according to its temperature for producing countercurrent flow with respect to said first air stream.

2. The method of cooling water which comprises discharging a spray of water downwardly through an upwardly moving stream of air which has been cooled and then dehydrated, cooling said water, re-circulating said water countercurrently through oils to absorb heat from a second air stream, and returning said water to the point of discharge.

3. The method of cooling water which comprises discharging a spray of warm water downwardly through a cooling tower, passing a precooled stream of air through a countercurrent cooling coil, conducting said cooled air stream through a dehydrating chamber and into the lower part of said tower, exhausting said stream of air upwardly countercurrently against said spray to evaporate a portion of said water, and collecting and recirculating said cooled discharged water.

4. The method of cooling water which comprises discharging a spray of water through a cooling tower, precooling a stream of air by passing it countercurrently over a coil containing said discharged water, passing said air through a dehydrating chamber and into said cooling tower, exhausting said air through said tower counter to said water discharge, collecting said discharged water, and re-circulating said water back to the point of discharge.

5. In a regenerative cooling system, the method of cooling water by contact with an air stream which comprises passing fresh unconditioned air over a cooling coil, dehydrating said air by contact with a dehydrating solution, passing said dehydrated air over a second cooling coil, and exhausting said air upwardly into contact with said water.

6. In a regenerative cooling system, the method of cooling water by spraying it downwardly into contact with an upwardly moving stream of air which comprises pre-cooling said air stream, subjecting said stream to the influence of a dehydrator, removing the absorbed moisture from the dehydrator as it is collected from the air stream, re-cooling said air stream, and passing said air stream into contact with said sprayed water.

7. In a cooling system of the class described, an air conditioning unit, a cooling tower adjacent said unit, spray nozzles in said cooling tower adapted to discharge water therethrough, means for collecting and re-circulating said water through a cooling coil disposed in said air conditioning unit and back to said spray nozzles, an air inlet to said tower, cooling coils in said air inlet and connected to said re-circulating means for countercurrently cooling the air entering said inlet, means in said inlet for countercurrently reducing the wet bulb temperature of air passing through said inlet and up through said tower, and means for passing a portion of said air to said air conditioning unit.

8. In an air conditioning system, the method of conditioning air which comprises passing fresh unconditioned air through a dehydrating chamber, maintaining a minimum moisture contact in said chamber, mixing said air with return air, passing the mixture over a cooling coil which is maintained at a relatively low temperature by spraying the fluid which has been circulated in said coil through a stream of pre-cooled air, collecting the sprayed fluid and re-circulating it into said coil.

9. In an air conditioning system, the method of conditioning air which comprises passing fresh unconditioned air over a cooling coil interposed in a regenerative cycle of a cooling tower, passing said air through a dehydrating chamber, mixing said air with return air, and passing the mixture over a second cooling coil which is maintained at a relatively lower temperature than said first cooling coil by spraying the fluid which has been circulated in said second coil through a stream of pre-cooled and dehydrated air, collecting the sprayed fluid, and re-circulating it through said second coil.

10. In an air conditioning system for an enclosure, a fresh air inlet, dehydrating means for spraying air passing through said inlet, means for automatically removing moisture from said dehydrating means when the moisture content reaches a predetermined value, a cooling coil, means for passing said air over said coil prior to its admission to said enclosure, and means for maintaining said coil cool comprising a cooling tower, spray nozzle for discharging water from said coil into an upwardly moving air stream, and means for collecting said sprayed water and re-circulating it through said coil.

11. In an air conditioning system, a regenerative cooling system comprising a cooling tower, means for spraying water down through said tower, means for drawing air upwardly through said tower, a dehydrator for lowering the wet bulb temperature of said air before it enters said tower, means for supplying a dehydrating solution to said dehydrator, and regenerative means mounted on the top of said cooling tower for maintaining said dehydrating solution cool, the air exhausted from said tower passing through said last named means.

12. In an air conditioning system, a regenerative cooling system comprising a cooling tower, means for spraying water downwardly through said tower, means for drawing air upwardly through said tower, a dehydrator for lowering the wet bulb temperature of said air before it enters said tower, means for supplying a dehydrating solution to said dehydrator, means for removing moisture from said dehydrating solution, and regenerative means mounted on the top of said cooling tower for maintaining said dehydrating solution cool.

13. In a regenerative cooling system, the method of cooling water by contact with an air stream which comprises passing fresh unconditioned air over a cooling coil, dehydrating said air, passing said air over a second cooling coil, exhausting said air through said tower in counter contact with said water, and controlling the rate at which said air is exhausted in accordance with the temperature of the cooled water.

14. The method of cooling water which comprises discharging a spray of water counter to a moving stream of pre-cooled air, withdrawing said discharged water, re-circulating the withdrawn water to re-discharge it through said air stream, and controlling the rate of circulation in accordance with the temperature of said discharged water.

15. In a regenerative cooling system, the method of cooling which comprises passing a stream of fresh unconditioned air through a dehydrating chamber, passing said stream of dehydrated air over an extended surface cooling coil, exhausting said dehydrated cooled air upwardly through a cooling tower, discharging a spray of water from said cooling coil downwardly through said tower, collecting said water, circulating a portion of said water through said coil, circulating another portion of said water through a coil disposed in the path of a stream of mixed return air and dehydrated fresh air, returning the water from said second coil to said tower, and discharging said water downwardly through said tower from a point above the discharge of the water from said first coil.

16. In a regenerative cooling system, the method of air conditioning which comprises passing a stream of fresh unconditioned air through a dehydrating chamber, mixing said air with return air, passing a second stream of unconditioned fresh air through a dehydrating chamber, cooling said second stream of dehydrated air, exhausting said second stream of air upwardly through a cooling tower, discharging a spray of water downwardly through said tower, said cooled and dehydrated second stream of air absorbing heat from said water, collecting said cooled water, forcing a portion of said cooled water through a coil disposed in the path of said first stream of mixed air, and returning said water to the top of said tower.

17. In a regenerative cooling system, the method of air conditioning which comprises passing a stream of fresh unconditioned air through a dehydrating chamber, mixing said air with return air, passing a second stream of unconditioned fresh air through a dehydrating chamber, cooling said second stream of dehydrated air, exhausting said second stream of air upwardly through a cooling tower, discharging a spray of water downwardly through said tower, said cooled and dehydrated second stream of air absorbing heat from said water, collecting said cooled water, forcing a portion of said cooled water through a coil disposed in the path of said first stream of mixed air, forcing another portion of said water through a coil disposed in the path of said second air stream, and returning both portions of said water to the top of said tower.

18. In a regenerative cooling system, the method of air conditioning which comprises passing a stream of fresh unconditioned air through a dehydrating chamber, mixing said air with return air, passing a second stream of unconditioned fresh air through a dehydrating chamber, maintaining a minimum moisture content in said dehydrating chambers, cooling said second stream of dehydrated air, exhausting said second stream of air upwardly through a cooling tower, discharging a spray of water downwardly through said tower, said cooled and dehydrated second stream of air absorbing heat from said water, collecting said cooled water, forcing a portion of said cooled water through a coil disposed in the path of said first stream of mixed air, forcing another portion of said water through a coil disposed in the path of said second air stream, and returning all of said water to the top of said tower.

19. In a regenerative cooling system, the method of air conditioning which comprises passing a stream of fresh unconditioned air through a dehydrating chamber, mixing said air with return air, passing a second stream of unconditioned fresh air through a dehydrating chamber, precooling the dehydrating solution used in said chambers, cooling said second stream of dehydrated air, exhausting said second stream of air upwardly through a cooling tower, discharging a spray of water downwardly through said tower, said cooled and dehydrated second stream of air absorbing heat from said water, collecting said cooled water, forcing a portion of said cooled water through a coil disposed in the path of said first stream of mixed air, and returning said water to the top of said tower.

20. In a regenerative cooling system, the method of air conditioning which comprises passing a stream of fresh unconditioned air through a dehydrating chamber, mixing said air with return air, passing a second stream of unconditioned fresh air through a dehydrating chamber, cooling said second stream of dehydrated air, exhausting said second stream of air upwardly through a cooling tower, discharging a spray of water downwardly through said tower, said cooled and dehydrated second stream of air absorbing heat from said water, collecting said cooled water, forcing a portion of said cooled water through a coil disposed in the path of said first stream of mixed air, forcing another portion of said water through a coil disposed in the path of said second air stream, returning both portions of said water to the top of said tower, and delivering said cooled mixed air stream to a delivery duct.

21. In a regenerative cooling system, the method of air conditioning and water cooling which comprises passing a stream of fresh unconditioned air through a dehydrating chamber, mixing said air with return air, exhausting a second stream of air upwardly through a cooling tower, discharging a spray of warmed water downwardly in counter-current contact with said air to cool said water, collecting said cooled water, circulating said collected water through a coil disposed in the path of said mixed air stream, absorbing heat from said air stream into said water, and returning said warmed water to the top of said tower.

22. In a regenerative cooling system, the method of air conditioning and water cooling which comprises passing a stream of fresh unconditioned air through a dehydrating chamber, mixing said air with return air, exhausting a second stream of precooled air upwardly through a cooling tower, discharging a spray of warmed water downwardly in countercurrent contact with said air to cool said water, collecting said cooled water, circulating said collected water through a coil disposed in the path of said mixed air stream, absorbing heat from said air stream into said water, returning said water to the top of said tower, and delivering said cooled air stream to a delivery duct.

23. In a regenerative cooling system, the method of air conditioning and water cooling which comprises passing a stream of fresh unconditioned air through a dehydrating chamber, mixing said air with return air, exhausting a second stream of precooled and dehydrated air upwardly through a cooling tower, discharging a spray of warm water downwardly in countercurrent contact with said air to cool said water, collecting said cooled water, circulating said collected water through a coil disposed in the path of said mixed air stream, absorbing heat from said air stream into said water, returning said warmed water to the top of said tower, and delivering said cooled air stream to a delivery duct.

24. In an air conditioning system, the method of conditioning air which comprises passing fresh unconditioned air through a dehydrating chamber, mixing said air with return air, cooling a refrigerating fluid by discharging said fluid downwardly against an upwardly moving stream of air, collecting said cooled fluid, circulating said fluid through a coil disposed in countercurrent contact with said mixed air stream, and returning said fluid, after it has absorbed heat from said mixed air stream, to said discharge point to recool it.

25. In an air conditioning system, the method of conditioning air which comprises passing fresh unconditioned air through a dehydrating chamber, mixing said air with return air, controlling the relative proportions of said mixture in accordance with the humidity of said return air, cooling a refrigerating fluid by discharging said fluid downwardly against an upwardly moving stream of air, collecting said cooled fluid, circulating said fluid through a coil disposed in countercurrent contact with said mixed air stream, and returning said fluid, after it has absorbed heat from said mixed air stream, to said discharge point to recool it.

26. In an air conditioning system, the method of conditioning air which comprises passing fresh unconditioned air through a dehydrating chamber, mixing said air with return air, cooling a refrigerating fluid by discharging said fluid downwardly against an upwardly moving stream of air, collecting said cooled fluid, circulating said fluid through a coil disposed in countercurrent contact with said mixed air stream, controlling the rate of circulation in accordance with the temperature of said discharged fluid, returning said fluid after it has absorbed heat from said mixed air stream to said discharge point to recool it, and delivering said mixed air stream to a delivery duct.

27. In a regenerative cooling system, the method of cooling water by spraying it against a moving stream of air which comprises intimately contacting all portions of said stream with a dehydrating solution, cooling said solution by conducting it through a closed circuit into heat transfer contact with cooling means, continually and automatically removing the moisture absorbed from said air stream from said solution, countercurrently cooling said dehydrated air stream, and passing said stream into countercurrent contact with said sprayed water.

28. In a regenerative cooling system, a cooling tower, an air inlet to said tower, a plurality of spray nozzles adjacent the top of said tower and adapted to discharge water downwardly in said tower, a dehydrating chamber, means for passing air therethrough, means for countercurrently cooling said air before dehydration thereof, means for drawing said cooled dehydrated air into said air inlet and upwardly against said water spray, means for collecting the sprayed water at the bottom of said tower, and recirculating means for delivering said cooled water through said cooling means to said nozzles.

29. In a regenerative cooling system, the method of dehumidifying air which comprises passing said air through a cooled surface, passing said cooled air into a dehydrating chamber, spraying said air with a dehydrating solution, collecting said sprayed solution, electrolyzing said collected solution to separate out the component parts of moisture absorbed therein, removing said parts from said solution, returning said solution for use in spraying, and passing said air through baffles to remove any entrained particles of said spraying solution.

30. In a regenerative cooling system, the method of dehumidifying air which comprises passing said air through a cooling surface, passing said cooled air into a dehydrating chamber, spraying said air with a dehydrating solution, collecting said sprayed solution, electrolyzing said collected solution to separate out the component parts of moisture absorbed therein, removing said parts from said solution, recombining said removed component parts, utilizing the energy of recombination for vaporization and removal of additional moisture, returning said solution for use in spraying, and passing said sprayed air through baffles to remove any entrained solution particles.

31. In a regenerative cooling system, the method of dehumidifying air which comprises precooling said air, passing said air into a dehydrating chamber, spraying said air with a dehydrating solution to absorb moisture therefrom, collecting said sprayed solution and absorbed moisture, osmotically removing said moisture, re-using said solution for further spraying, and passing said sprayed air through baffles to remove any entrained particles of said solution.

32. In combination, in a cooling tower, an air inlet at the lower end of said tower, means for exhausting air upwardly through said tower, a plurality of discharge means disposed in the upper part of said tower for discharging the water downwardly therethrough, means for collecting said discharged water, means for circulating said collected water through a plurality of independent cooling coils, and means for returning said water from said coils to said discharge means, said discharge means being so disposed that the warmest return water is discharged at the uppermost part of said tower.

33. In a cooling system of the class described, an air conditioning unit, a cooling tower adjacent said unit, spray nozzles in said cooling tower adapted to discharge water therethrough, means for collecting and recirculating said water through a cooling coil disposed in said air conditioning unit and back to said spray nozzles, an air inlet to said tower, means in said air inlet for reducing the wet bulb temperature of air passing through said inlet and up through said tower, and regenerative cooling means mounted on top of said tower for cooling said wet bulb temperature reducing means.

34. In a cooling system of the class described, an air conditioning unit, a cooling tower located adjacent said unit, spray nozzles in said cooling tower adapted to discharge water therethrough, means for collecting and recirculating said water through a cooling coil in said air conditioning unit and back to said spray nozzles, an air inlet to said tower, means in said inlet for reducing the wet bulb temperature of air passing through said inlet and up through said tower, and means for regeneratively cooling said last named means.

35. In an air conditioning system, the method of conditioning air which comprises passing air through dehydrating chambers, drawing a portion of said air to a cooling tower, exhausting said air upwardly through said tower against a downward discharge of water, maintaining said dehydrating chambers at substantially a constant temperature by absorbing heat therefrom into the portion of air leaving said tower, and passing the remainder of said air into said air conditioning system.

36. In an air conditioning system, the method of cooling water which comprises passing a stream of air through a dehydrating chamber, conducting said dehydrated air to the lower end of a cooling tower, exhausting said air upwardly through said tower against a downward discharge of warm water to cool said water and humidify said air, passing the solution used in said dehydrating chamber into the path of said exhausted humidified air, and absorbing heat from said solution into said exhausted air.

37. In an air conditioning system, the method of conditioning air which comprises passing air through dehydrating chambers, exhausting a portion of said air upwardly through a cooling tower against a downward discharge of spray water, maintaining said dehydrating chamber at substantially a constant temperature by circulating the solution in said chamber through coils disposed in the path of said portion of said exhausted air stream, said air stream absorbing heat from said solution, and passing another portion of said air into said air conditioning system.

38. In an air conditioning system, the method of conditioning air which comprises removing from the air used in said air conditioning system a portion of the latent and sensible heat thereof, exhausting a portion of said air stream through a two-stage cooling tower, adding the removed sensible heat of said air to said portion of said air stream being exhausted in the first stage of said cooling tower, and adding the removed latent heat of said air to said portion of said air being exhausted in the second stage of said cooling tower.

39. In a cooling system of the class described, an air conditioning unit, a cooling tower located adjacent said unit, spray nozzles in said cooling tower adapted to discharge water therethrough, means for collecting and recirculating said water through a cooling coil in said air conditioning unit and back to said spray nozzles, an air inlet to said tower, means in said inlet for reducing the wet bulb temperature of air passing through said inlet and up through said tower, and means comprising a chamber through which air discharged from said tower is caused to pass to effect cooling of said wet bulb temperature reducing means.

40. In a cooling system of the class described, an air conditioning unit, a cooling tower located adjacent said unit, spray nozzles in said cooling tower adapted to discharge water therethrough, means for collecting and recirculating said water through a cooling coil in said air conditioning unit and back to said spray nozzles, an air inlet in said tower, dehumidifying means in said inlet for reducing the wet bulb temperature of air passing through said inlet and up through said tower, and means comprising a chamber through which air discharged from said tower is caused to pass in counter-current heat exchange relation to said dehumidifying means to effect cooling of the same.

41. In an air conditioning system, the method of cooling water by contact with an air stream which comprises passing unconditioned air over a cooling coil, dehydrating said air by contact with a solution of lithium chloride, passing said dehydrated air over a second cooling coil, and exhausting said air upwardly into contact with said water.

42. In an air conditioning system, the method of dehumidifying air which comprises precooling said air, passing said air into a dehydrating chamber, spraying said air with a solution of lithium chloride to absorb moisture therefrom, electrolytically removing the absorbed moisture from said spraying solution, returning said solution to said chamber for further spraying, and passing said sprayed air through baffles to remove any entrained particles of said solution.

43. In an air conditioning system, a cooling tower, a plurality of spray nozzles in said tower, means for exhausting air upwardly through said tower against a downward discharge of water, said nozzles being placed in said tower in such position that the temperature of the water discharged therefrom corresponds to the wet bulb temperature of the air passing that point.

44. The method of cooling water which comprises discharging said water from a plurality of points in a cooling tower into contact with a moving stream of air, and maintaining a true countercurrent relationship by disposing the discharge points so that the temperature of the water discharged at each point corresponds to the wet bulb temperature of the air passing that point.

45. The method of cooling water which comprises contacting said water countercurrently with a stream of precooled dehydrated air, exhausting said contacted air into heat exchange relationship with a dehydrating solution to cool said solution, and utilizing said cooled solution to precool and dehydrate uncontacted entering air.

46. The method of conditioning air which comprises dehumidifying and cooling air by contact with a precooled dehydrating solution, separating said contacted air into two portions, conducting one portion of the air into an air conditioning system, passing the other portion of the air through a cooling tower and into countercurrent heat exchange contact with a closed circuit portion of said solution, and employing water as an intimate intermediate heat transferring agent for cooling said solution and for increasing the total heat of said other portion of air.

47. The method of conditioning air which comprises dehumidifying said air by contact with a dehydrating solution, and maintaining said dehumidification substantially iso-thermal by passing said solution through conduits into counter-current contact with a portion of said conditioned air in the presence of a volatile heat transferring medium whereby the total heat in said air is increased without increasing its dry bulb temperature.

48. The method of cooling air for an enclosure which comprises passing said air into counter-current heat exchange relation with cooling coils, circulating water through said coils, maintaining said water cool by countercurrent evaporation of said water into a portion of said cooled air, and passing the remainder of said air to said enclosure.

49. In a two-stage regenerative cooling tower of the class described, the method of heat transfer which comprises transferring heat at one temperature in the first stage of said tower into air dehumidified prior to its admission into said tower, and transferring the heat of dehumidification of said air at a higher temperature into said air in the second stage of said tower.

50. In a two-stage regenerative cooling tower of the class described, the method of cooling water which comprises dehumidifying air by dry adsorption, transferring at a low temperature in the first stage of said tower the heat in said water into said air, extracting the heat of adsorption and conducting it to the second stage of said tower, and transferring said heat of adsorption into said air at a higher temperature in the second stage of said tower.

51. The method of cooling air in an enclosure in which air is locally recirculated which comprises pre-cooling a stream of outdoor air to the recirculated air temperature, dividing said pre-cooled air stream, passing one portion of said stream into counter-current contact with water to cool said water, admixing the other portion of said stream with said recirculated air, and cooling said admixed air by counter-current contact with said cooled water.

52. The method of cooling air for an enclosure which comprises pre-cooling a stream of outdoor air, dividing said air into two portions, passing one portion of air into said enclosure, extracting heat from said one portion of air during its passage to said enclosure, and transferring said heat to the other portion of air.

53. The method of conditioning air for an enclosure which comprises dehumidifying fresh outdoor air, regeneratively cooling recirculated air from said enclosure, admixing said dehumidified and recirculated air, and delivering said admixed air to said enclosure.

54. The method of conditioning air in an enclosure which comprises removing latent heat only from fresh outdoor air, locally recirculating the air in said enclosure, directly removing sensible heat from said enclosure by said recirculation, and admitting a portion of said conditioned outdoor air to said enclosure with said recirculated air.

55. In a regenerative cooling system, the method of cooling air in an enclosure which comprises removing latent and sensible heat from said enclosure by locally recirculating air from said enclosure and cooling the same, conducting said heat to a regenerative cooling tower, and counter-currently transferring said heat into a stream of pre-cooled, dehumidified air.

56. The method of conditioning air in an enclosure which comprises dehumidifying a stream of fresh outdoor air, maintaining said dehumidification substantially iso-thermal, locally recirculating the air in said enclosure, extracting sensible heat from said recirculated air, conducting said heat to a regenerative cooling system, transferring said heat by counter-current contact with a stream of pre-cooled air into said pre-cooled air stream, and mixing said dehumidified outdoor air with said cooled recirculated air.

57. The method of conditioning air for an enclosure which comprises extracting latent heat from a stream of fresh outdoor air, extracting sensible heat from locally recirculated air from said enclosure, admitting a portion of said outdoor air stream to said enclosure, conducting said extracted latent and sensible heat to a regenerative cooling system, and absorbing said heat by counter-current contact into the remaining portion of said outdoor air.

58. A method for utilizing the evaporative cooling effect of atmospheric air which comprises cooling said air to a point between the wet bulb temperature and the dew point thereof by indirect heat exchange with water at such temperature, cooling water to such temperature by subjecting an extended surface of said water to direct contact with at least a portion of the air previously cooled by said indirect heat exchange, and utilizing at least a portion of the water thus cooled to effect the cooling of said air by said indirect heat exchange.

59. A method for utilizing the evaporative cooling effect of atmospheric air which comprises cooling said air to approximately the dew point thereof by indirect heat exchange with water at a temperature approximating said dew point, cooling water to approximately said dew point by subjecting an extended surface of said water to direct contact with at least a portion of the air previously cooled by said indirect heat exchange, and utilizing at least a portion of the water thus cooled to effect the cooling of said air by said indirect heat exchange.

60. A method for utilizing the evaporative cooling effect of atmospheric air which comprises cooling said air to approximately the dew point thereof by indirect heat exchange with water at a temperature approximating said dew point, passing at least a portion of said air into direct contact with water in finely divided form, and utilizing at least a portion of the water thus cooled to effect the cooling of said air by said indirect heat exchange.

61. A method for utilizing the evaporative cooling effect of atmospheric air which comprises cooling said air to approximately the dew point thereof by indirect heat exchange with water at a temperature approximating said dew point, passing a portion of said air into direct contact with water in finely divided form, and utilizing the water thus cooled to effect the cooling of said air by said indirect heat exchange.

62. A method for utilizing the evaporative cooling effect of atmospheric air which comprises cooling said air to approximately the dew point thereof by indirect heat exchange with water at a temperature approximating said dew point, passing said air into direct contact with water in finely divided form, and utilizing a portion of the water thus cooled to effect the cooling of said air by said indirect heat exchange.

63. Apparatus for utilizing the evaporative cooling effect of atmospheric air comprising means for providing a current of air, means for spraying a stream of water into said current of air, collecting means for said water, and means for bringing said collected water into counter-current indirect heat exchange relation with said current of air prior to its direct contact with said stream of water.

64. Apparatus for utilizing the evaporative cooling effect of atmospheric air comprising means for providing a current of air, means for bringing a stream of water into intimate contact with said current of air, collecting means for said water, and means for bringing said collected water into counter-current indirect heat exchange relation with said current of air prior to its direct contact with said stream of water.

65. Apparatus for utilizing the evaporative cooling effect of atmospheric air comprising means for providing a current of air, means for spraying a stream of water into said current of air in a plurality of successive counter-current stages, collecting means for said water, and means for bringing said collected water into counter-current indirect heat exchange relation with said current of air prior to its direct contact with said stream of water.

ROBERT B. P. CRAWFORD.